Figure 1:
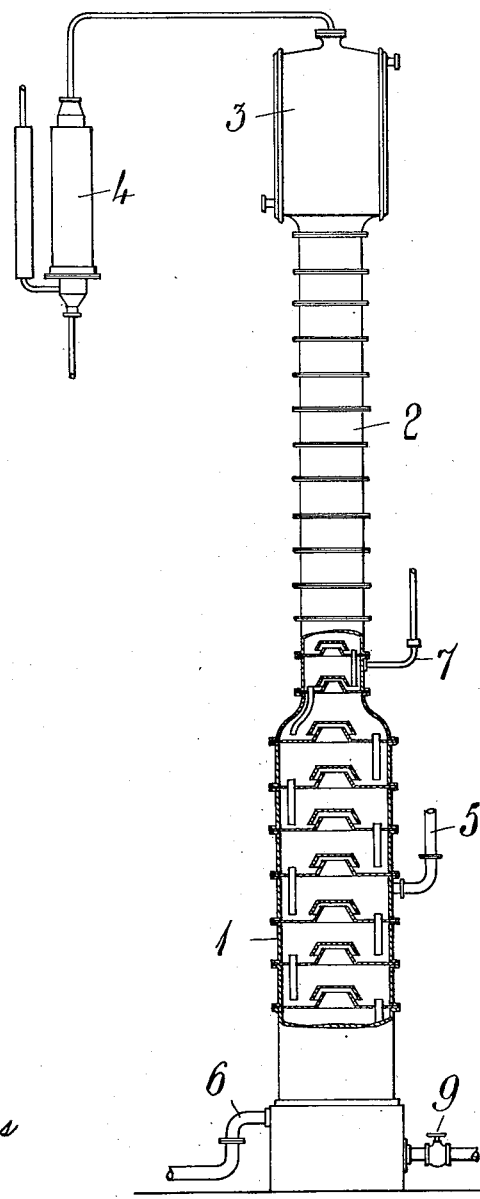

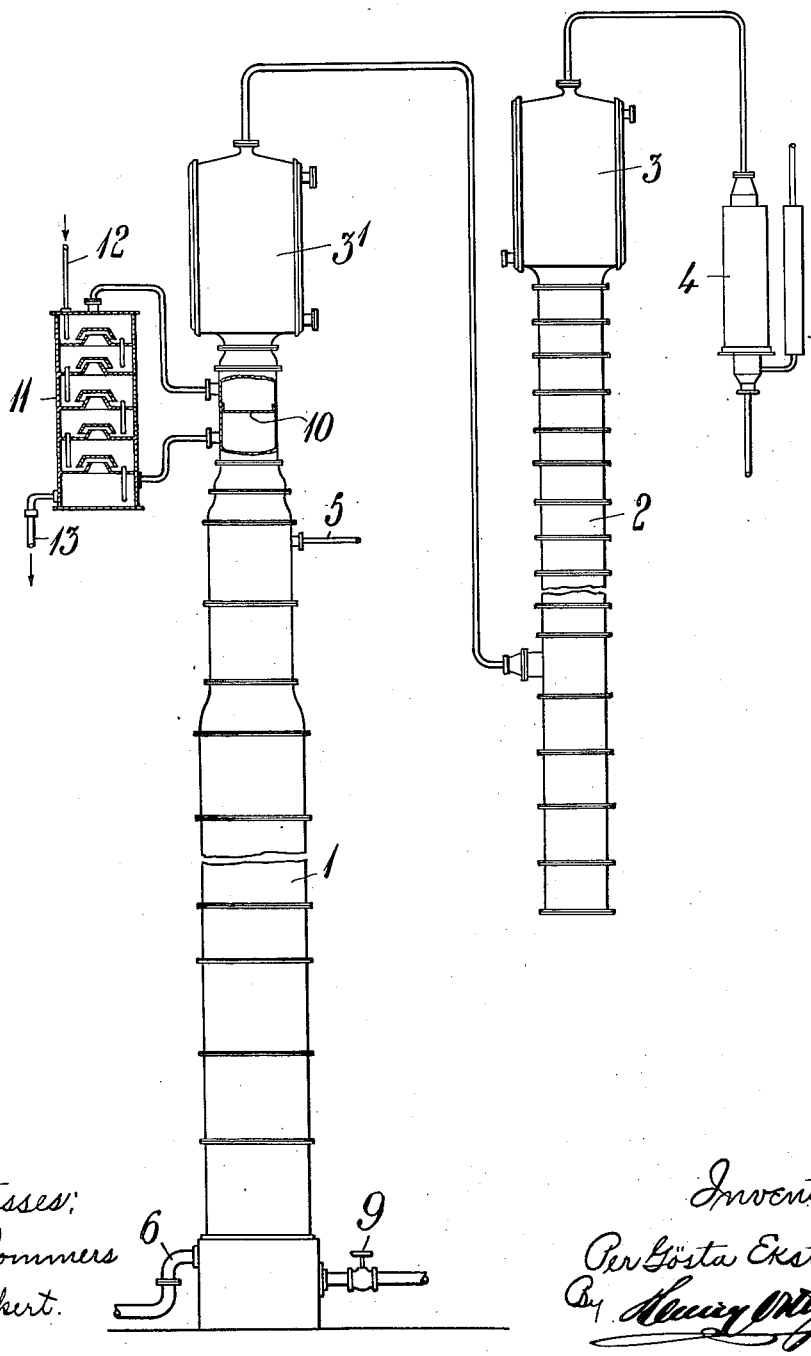

UNITED STATES PATENT OFFICE.

PER GÖSTA EKSTRÖM, OF HARNÄS, SWEDEN.

METHOD OF PURIFYING ALCOHOL MANUFACTURED BY DISTILLING FERMENTED SULFITE LIQUOR.

1,095,830.  Specification of Letters Patent.  Patented May 5, 1914.

Application filed February 24, 1912. Serial No. 679,798.

*To all whom it may concern:*

Be it known that I, PER GÖSTA EKSTRÖM, a citizen of the Kingdom of Sweden, residing at Harnäs, Sweden, have invented new and useful Improvements in Methods of Purifying Alcohol Manufactured by Distilling Fermented Sulfite Liquor, of which the following is a specification.

This invention relates to a method of purifying alcohol manufactured by distilling fermented sulfite liquor.

It is well known that fermented sulfite liquor contains besides alcohol small quantities of more or less volatile compounds, such as sulfurous acid, aldehydes, ketones and so on, which follow the alcohol during the distillation process and make the final product impure and which also partly affect the material of the distilling apparatus.

The present invention relates to a method which renders it possible to remove in an effective manner the impurities in the manufacture of alcohol by distilling fermented sulfite liquor.

The invention consists, briefly, in treating the alcohol with bases during the distillation itself, while the alcohol and the impurities accompanying the same are in form of steam or vapor. The distillation may be carried out by means of any well known distilling apparatus for continuous distillation. According to this invention the base, for instance soda (carbonate of sodium), is introduced directly into the distilling apparatus, or one may provide a separate purifying apparatus charged with the basic purifying agent, through which the weak alcohol vapor distilled from the sulfite liquor is led, before it is led through the other parts of the apparatus to be concentrated and condensed.

In order to make the invention more easily understood it will be described herebelow with reference to the accompanying drawings, which show in Figures 1 and 2 two different sets of apparatus which may be used for carrying the invention into practice.

Referring to Fig. 1, 1 indicates a column apparatus for continuous distillation, 2 a rectifying apparatus arranged directly on the distillation column, 3 a deflegmator and 4 a cooler for condensing the concentrated alcohol vapor, said cooler being connected with the deflegmator 3. The said apparatus are of well known type. 5 indicates a supply pipe for the sulfite liquor to be distilled and 6 a drawing off pipe for the lye from which the alcohol has been separated. The portion of the column adjacent to the distilling apparatus may be charged with a basic reacting agent, for instance a solution of carbonate of sodium or a diluted solution of caustic soda, through a supply pipe 7 provided on a suitable level above the supply pipe 5. 9 indicates a supply pipe for the steam necessary for carrying out the distillation.

The apparatus described above works as follows: The liquor to be distilled is admitted continuously through the pipe 5 and flows successively downward through the apparatus and escapes through the pipe 6. On its way through the apparatus 1 the liquor meets the steam supplied through the pipe 9, by which the alcohol together with some impurities, such as sulfurous acid, and aldehyde compounds are driven off as steam or vapor. These vapors pass upward through the column. During the passage of these vapors through that portion of the column which is charged with a basic agent and which is situated between the supply pipe 7 and the liquor supply pipe 5, the sulfurous acid accompanying the alcohol vapors is bound by the basic agent, while other vapors, such as aldehyde-sulfurous-acid or acetaldehyde-sulfurous-acid, are decomposed so that free aldehyde and sulfurous acid are formed. The aldehyde accompanies the alcohol vapors and may be separated from the gases remaining after the condensation of the concentrated alcohol, while the freed sulfurous acid will be bound to the sodium according to the following formula:

(Acetaldehyde sulfurous acid.)
(Aldehyde.)

When the alcohol vapors in this manner have been freed from injurious impurities the concentration and condensation thereof are accomplished in the usual manner in the other parts of the plant.

In Fig. 2, 1 indicates a distilling column, 2 a rectifying column separated from said distilling column, 3 a deflegmator provided on the rectifying column, $3^1$, a second deflegmator provided on the distilling column, and 4 a cooler for condensing the concentrated alcohol vapors. 5 is a supply pipe for the liquor to be distilled, 6 is a drawing off pipe for the distilled liquor, and 9 is a supply pipe for steam. These apparatus are well known. The distilling column 1 is at its top tightly closed by a wall 10 and to the column is on both sides of this wall connected a special apparatus 11 for purifying the alcohol vapors. Said apparatus may be of arbitrary construction and may suitably be carried out as a column apparatus of the same type as the usual distilling columns, as is shown in the drawing. 12 indicates a supply pipe for a basic agent, for instance a solution of soda, and 13 indicates a drawing off pipe for the reaction agent saturated with impurities. This plant works substantially in the same manner as that shown in Fig. 1. The alcohol vapors distilled off in the column 1 together with accompanying impurities are compelled by the wall 10 to pass through the purifying apparatus 11 before they can enter into the deflegmator $3^1$. The chemical purifying process in the apparatus 11 is the same as that described with reference to Fig. 1.

Having now described my invention, what I claim as new and desire to secure by Letters Patent is:

1. In the manufacture of alcohol from fermented sulfite liquor, a method of removing sulfurous acid and aldehyde compounds from the alcohol, which comprises treating the alcohol vapors during the distilling process proper with basic substances capable of binding the sulfurous acid and decomposing the aldehyde compounds contained in the alcohol vapors, substantially as and for the purpose set forth.

2. In the manufacture of alcohol from fermented sulfite liquor, a method of removing sulfurous acid and aldehyde compounds from the alcohol, which consists in treating the alcohol vapors during the distilling process proper with a solution of soda, substantially as and for the purpose set forth.

In testimony that I claim the foregoing as my invention, I have signed my name in presence of two subscribing witnesses.

PER GÖSTA EKSTRÖM.

Witnesses:
LUND DELMAR,
JOHN DELMAR.